(No Model.)
F. I. GETTY & F. DICKINSON.
ADJUSTING DEVICE FOR MACHINISTS' TOOLS.
No. 314,663. Patented Mar. 31, 1885.
Fig. 1.
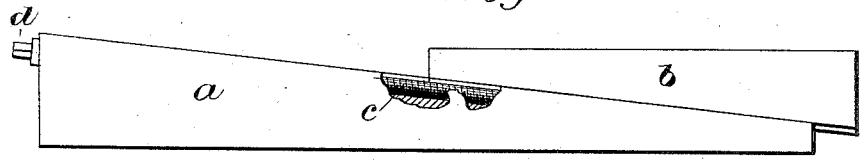
Fig. 2.
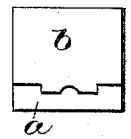
Fig. 3. Fig. 4.
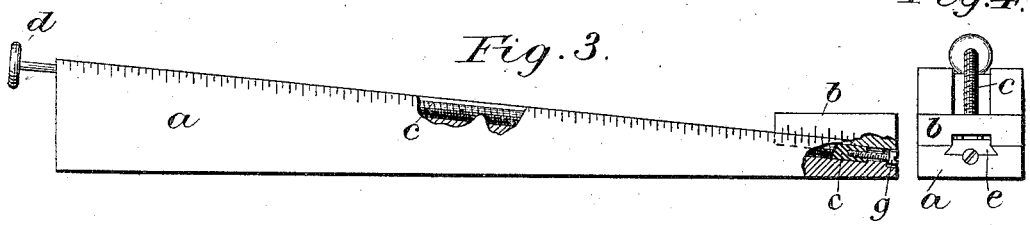
Fig. 5.
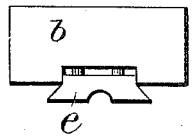
Fig. 6.
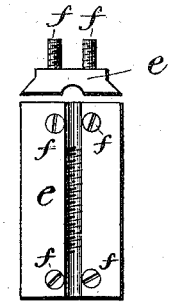
Fig. 7.
Witnesses:
Wm A. Gabriel
R. L. Taft
Inventor:
Fred I. Getty
Fred. Dickinson
by Fred I. Getty.

UNITED STATES PATENT OFFICE.

FRED. I. GETTY AND FREDERICK DICKINSON, OF GENEVA, OHIO.

ADJUSTING DEVICE FOR MACHINISTS' TOOLS.

SPECIFICATION forming part of Letters Patent No. 314,663, dated March 31, 1885.

Application filed May 16, 1884. (No model.)

*To all whom it may concern:*

Be it known that we, FRED. I. GETTY and FREDERICK DICKINSON, both of Geneva, county of Ashtabula, and State of Ohio, have invented new and useful Improvements in Machinists' Tools, of which the following is a specification, with reference to the accompanying drawings.

The invention relates to that class of hand-tools known as "parallels" or "parallel planes," and also to a modification of the device invented by us, and which is protected by Letters Patent No. 293,647, dated February 19, 1884.

The object of our invention is the substitution of a means of adjustment better adapted for small thin parallels than that employed in the original device, which is to be used principally upon the larger-sized tools, and also the addition of a device for taking up lost motion occasioned by wear.

In the accompanying drawings, in which the same letters of reference indicate the same parts in the different views, Figure 1 is a side view of the tool, with a portion broken away, showing the interior. Fig. 2 is an end view of the same. Figs. 3 and 4 show, respectively, a side and end view of a form designed as a measuring-tool, having an arrangement for taking up lost motion. Fig. 5 is an enlarged view of a portion of Fig. 4, showing that arrangement. Figs. 6 and 7 show, respectively, an end and bottom view of the device disconnected from the tool.

The adjusting apparatus consists, as shown, of a screw, $c$, which takes the place of the rack, pinion, &c., employed in the original.

In Figs. 1 and 3 a portion is broken away to show the screw and its position. The screw $c$ lies in a semi-cylindrical groove in the part $a$, Figs. 1, 3, running parallel with its upper side from the end $d$ nearly to the opposite end of the parallel. The threads upon the upper side of the screw lock into the segment of a thread upon the under side of the part $b$, Fig. 1, or of the dovetail $e$, connected with the part $b$, Fig. 4. In part $a$ the groove which contains the screw $c$ extends from the left nearly to the right end, as shown. In line with this groove and to the right of it, is a short groove or cavity made to receive the head of the screw $g$. A small hole connects the two grooves. A screw, $g$, passes through the hole and secures the long screw $c$ in its place. The screws $c$ and $g$ remain fixed, relatively, by the friction of the threads where they fit together. The union with screw $g$ allows screw $c$ to revolve freely, but prevents its longitudinal movement, and affords a means of taking up any such movement occasioned by wear. When the tool is required only to support or raise a weight, as in Figs. 1 and 2, the screw $g$ is unnecessary, as the screw $c$ is kept from slipping down the incline by its contact with the end of the groove. Then by the use of a wrench or burr-wheel at the end $d$ the screw may be turned and the parts $a$ and $b$ adjusted.

When the tool is designed only for supporting a weight, the parts $a$ and $b$ may be fitted together with a square tongue and groove, as shown, Fig. 2. In this case they may be separated and placed together approximately at the desired point, and then accurately adjusted by means of the screw. This is not the case with the form shown in Figs. 3 and 4. All adjustment in this case must be done with the screw. The dovetail $e$, Figs. 4 and 5, is separate from $b$ and held to it by screws, which pass through $e$ into $b$. There being a slight space between them, $b$ and $e$ may be drawn together by the screws, and consequently $a$ and $b$ drawn together, and any looseness occasioned by wear taken up.

In Fig. 7 may be seen the screw-heads $f f f f$, and the thread-segment cut into the bottom of the dovetail, and which fits on the adjusting-screw $c$.

Having described our invention, what we claim as new, and desire to secure by Letters Patent, is—

1. In an adjusting device for tools, the parts $a$ and $b$, having their inclined faces in contact, as shown, in combination with the screw $c$, swiveled to the part $a$ and held from longitudinal movement therein, and having its threads in engagement with a threaded groove in the part $b$, substantially as described, and for the purposes set forth.

2. An adjusting device in which one part having an inclined face is moved upon another similar part by a screw-rod, held in one part from longitudinal movement in either direction, as shown, the threads of said rod engaging with a correspondingly-threaded dovetail upon the other part, substantially as shown, and for the purposes set forth.

3. In an adjusting device, the fixed part $a$ and movable part $b$, in combination with the screw $c$, attached to the part $a$ so as to turn therein, and the threaded dovetail piece adapted to slide in the part $a$ and secured by screws to the part $b$, so that by tightening the screws lost motion between the parts $a$ and $b$ occasioned by wear may be taken up.

In testimony that we claim the foregoing we have hereunto set our hands this 20th day of March, 1884.

FRED. I. GETTY.
FRED. DICKINSON.

Witnesses as to Fred. I. Getty:
I. K. BRADLEY,
WM. D. CARPENTER.

Witnesses as to Fred. Dickinson:
L. R. PARKER,
O. C. PINNEY.